US 9,272,219 B2

(12) United States Patent
Somarajapuram

(10) Patent No.: US 9,272,219 B2
(45) Date of Patent: *Mar. 1, 2016

(54) THREE DIMENSIONAL OPERATIONS IN AN ISOMETRIC PROJECTION

(71) Applicant: Zynga Inc., San Francisco, CA (US)

(72) Inventor: Sreenath Somarajapuram, Ernakulam (IN)

(73) Assignee: Zynga Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/681,433

(22) Filed: Apr. 8, 2015

(65) Prior Publication Data
US 2015/0217197 A1 Aug. 6, 2015

Related U.S. Application Data

(63) Continuation of application No. 13/745,103, filed on Jan. 18, 2013, now Pat. No. 9,033,805.

(30) Foreign Application Priority Data

Jan. 19, 2012 (IN) .............................. 164/DEL/2012

(51) Int. Cl.
*A63F 9/24* (2006.01)
*A63F 13/52* (2014.01)
*A63F 13/00* (2014.01)
(Continued)

(52) U.S. Cl.
CPC ................. *A63F 13/52* (2014.09); *A63F 13/00* (2013.01); *A63F 13/10* (2013.01); *G06T 19/20* (2013.01); *A63F 2300/308* (2013.01); *A63F 2300/556* (2013.01); *A63F 2300/807* (2013.01); *G06T 2219/2004* (2013.01)

(58) Field of Classification Search
CPC . A63F 13/10; A63F 13/12; A63F 2300/6009; A63F 2300/6018; A63F 2300/69
See application file for complete search history.

(56) References Cited

U.S. PATENT DOCUMENTS

| 8,221,243 | B2 * | 7/2012 | Van Luchene | .................. 463/42 |
| 8,328,610 | B2 * | 12/2012 | Shimura et al. | .................... 463/9 |
| 2005/0045025 | A1 * | 3/2005 | Wells et al. | ..................... 84/615 |

(Continued)

OTHER PUBLICATIONS

"U.S. Appl. No. 13/745,103, Non Final Office Action mailed Aug. 6, 2014", 6 pgs.

(Continued)

*Primary Examiner* — Masud Ahmed
(74) *Attorney, Agent, or Firm* — Schwegman Lundberg & Woessner, P.A.

(57) ABSTRACT

A system, computer-readable storage medium storing at least one program, and a computer-implemented method for providing three-dimensional operations in an isometric projection are presented. A graphical user interface may be presented to a user that presents an isometric projection of a virtual environment. A placement event corresponding to a user initiating a placement of a game object within the virtual environment may then be detected. The game object may be modeled with a two-dimensional model. Selection coordinates associated with the placement event are then obtained. Using the selection coordinates, it may be determined that the user selected one of a plurality of surface areas of an existing game object. Then, the game object is then inserted within the virtual environment relative to the one of the plurality of surface areas of the existing game object.

17 Claims, 13 Drawing Sheets

(51) Int. Cl.
*A63F 13/40* (2014.01)
*G06T 19/20* (2011.01)

(56) References Cited

U.S. PATENT DOCUMENTS

| | | | |
|---|---|---|---|
| 2005/0202862 A1* | 9/2005 | Shuman et al. | 463/9 |
| 2006/0080613 A1* | 4/2006 | Savant | 715/745 |
| 2008/0078758 A1* | 4/2008 | Shimura et al. | 219/717 |
| 2008/0280685 A1* | 11/2008 | Hansen et al. | 463/42 |
| 2009/0011835 A1* | 1/2009 | Hansen et al. | 463/42 |
| 2013/0190087 A1 | 7/2013 | Somarajapuram | |

OTHER PUBLICATIONS

"U.S. Appl. No. 13/745,103, Notice of Allowance mailed Jan. 15, 2015", 5 pgs.

"U.S. Appl. No. 13/745,103, Response filed Nov. 3, 2014 to Non-Final Office Action dated Aug. 6, 2014", 10 pgs.

* cited by examiner

US 9,272,219 B2

THREE DIMENSIONAL OPERATIONS IN AN ISOMETRIC PROJECTION

RELATED APPLICATIONS

This application is a continuation of U.S. patent application Ser. No. 13/745,103, filed on Jan. 18, 2013, which claims the benefit of priority under 35 U.S.C. §119 of Indian Provisional Patent Application Serial Number 164/DEL/2012, filed on Jan. 19, 2012, the benefit of priority of each of which is claimed hereby, and each of which are incorporated by reference herein in its entirety.

TECHNICAL FIELD

The present disclosure relates to gaming systems. In particular, an example gaming system provides three dimensional operations for a game utilizing an isometric projection of a virtual environment.

BACKGROUND

In the fields of video games, the technique of using an isometric projection has been popular because of the ease with which 2 dimensional (2D) sprite- and tile-based graphics can be made to represent or "simulate" a 3 dimensional (3D) gaming environment. Because objects in an isometric projection do not change size as they move about the game environment, the gaming systems do not scale sprites or do the complex calculations used by traditional 3D gaming environments. The relative simple computations used to render isometric projections allow such systems as 8-bit, 16-bit game systems, and, more recently, handheld and mobile devices (e.g., mobile phones) to simulate large 3D gaming environments easily.

BRIEF DESCRIPTION OF THE DRAWINGS

The present disclosure is illustrated by way of example, and not limitation, in the figures of the accompanying drawings, in which like reference numerals indicate similar elements unless otherwise indicated. In the drawings.

DESCRIPTION OF EXAMPLE EMBODIMENTS

Overview

Figure 1:
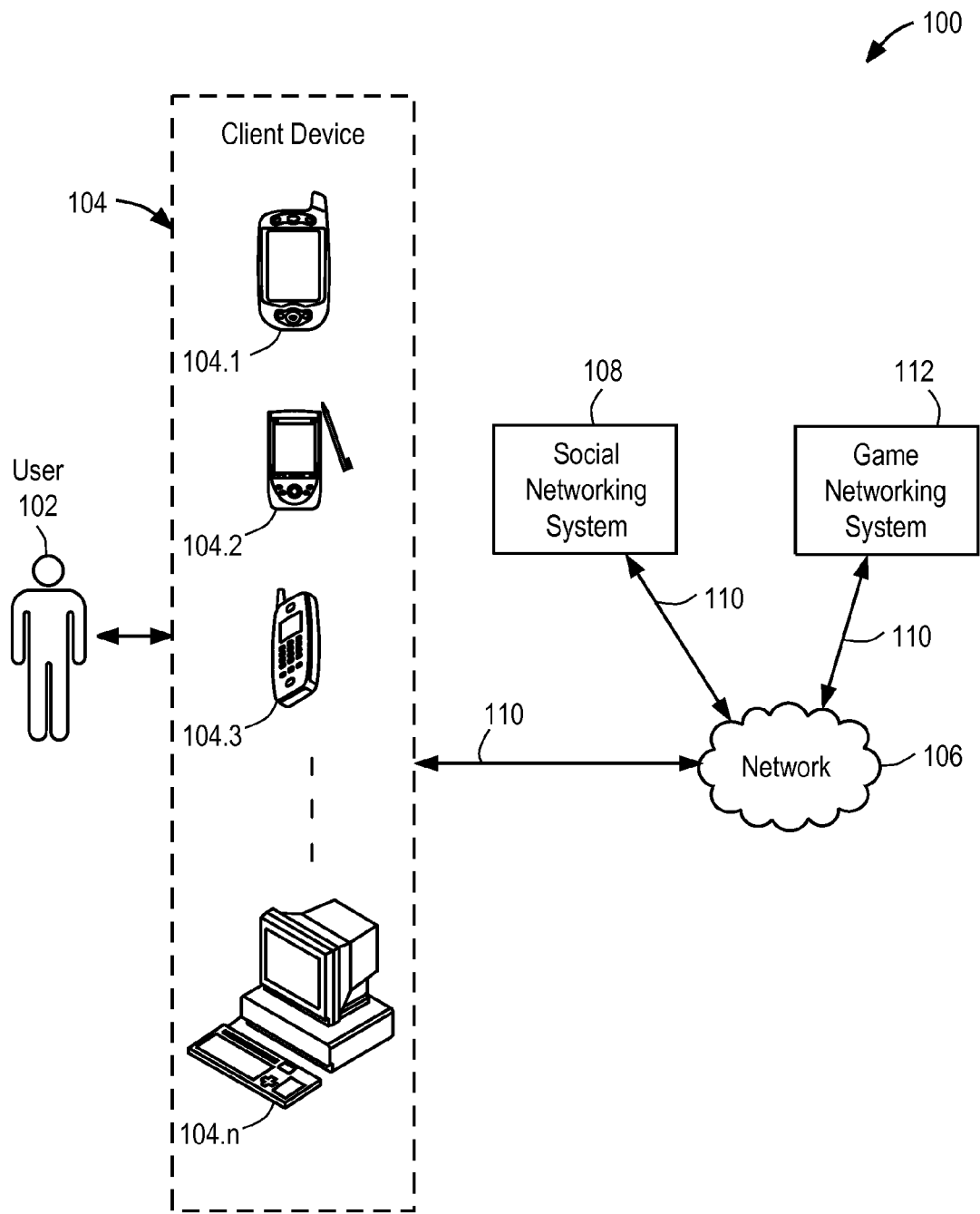
FIG. 1 illustrates an example of a gaming platform for implementing various example embodiments.

Users of computer-implemented systems may access a gaming platform to interact with a virtual environment. For example, using a gaming platform, as provided by Zynga, Inc., a user (e.g., a player) may access a computerized game that displays a virtual environment, referred to herein as a "virtual environment," in which the player may control a character player, manipulate objects, or interact with or otherwise modify the virtual environment. Consistent with various embodiments, the virtual environment may represent a landscape and a player may select, move, and place virtual objects (e.g., blocks, building, items, characters, and the like) therein. To provide comparatively fast processing, embodiments may display the virtual environment as an isometric projection. An "isometric projection," as used herein, may refer to a rendering of a 2D model of an image, such as a raster image. It is to be appreciated that the term isometric projection, as used herein, may refer to true isometric projections or any other suitable parallel projection, such as, for example, diametric projection or a trimetric projection. Other common names for isometric projections include 2.5D, ¾ perspective, and pseudo-3D.

It is to be appreciated that an isometric projection is different from a three dimensional projection. For example, in comparison, a three dimensional projection typically refers to a rendering of a 3D model of an image. Accordingly, a game object may include data structures specifying 3D geometric dimensions of the game object using. As a simple example, a cube may be characterized by a data structure that specifies the cubes height, width, and depth.

In some embodiments described herein, a system and method may allow a player to perform three dimensional operations on game objects represented in an isometric projection. For example, a player may place or otherwise insert an object relative to a surface of another object displayed in an isometric projection. Such embodiments may be utilized in a game platform that represents a game environment with game objects that are placed on grids. In such embodiments, a user may then place such game objects such as cubes relative to the surface of other game objects. Such placements of the game objects may provide an impression of building an object along a three dimensional coordinate system.

In other embodiments described herein, a system and method may allow particular aspects of an isometric projection to be altered. For example, the angle of display of an isometric projection may be adjusted. Such an adjustment may give an impression that an angle of the camera has been changed (e.g., the camera has been raised or lowered). Some embodiments may include separate sets of pre-rendered images for each adjusted isometric projection.

It is to be appreciated that example embodiments described in this disclosure may have many practical advantages. For example, in one example embodiment, providing three dimensional operations in an isometric projection consumes comparatively less computational resources (e.g., processor time and network bandwidth) than corresponding 3D operations being performed in a 3D projection. Accordingly, some embodiments may be especially useful in mobile devices or any other computational device with limited or relatively low computational resources.

These and other embodiments of the invention are described in further detail below.

Example System

FIG. 1 illustrates an example of a gaming platform 100 for implementing various example embodiments. In some embodiments, the gaming platform 100 comprises a user 102, a client device 104, a network 106, a social networking system 108, and a game networking system 112. The components of the gaming platform 100 may be connected directly or over a network 106, which may be any suitable network. In various embodiments, one or more portions of the network 106 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

Although FIG. 1 illustrates a particular example of the arrangement of the user 102, the client device 104, the social networking system 108, the game networking system 112, and the network 106, this disclosure includes any suitable arrangement or configuration of the user 102, the client device 104, the social networking system 108, the game networking system 112, and the network 106.

The client device 104 may be any suitable computing device (e.g., devices 104.1-104.n), such as a smart phone 104.1, a personal digital assistant 104.2, a mobile phone 104.3, a personal computer 104.n, a laptop, a computing tablet, or any other device suitable for playing a virtual game. The client device 104 may access the social networking system 108 or the game networking system 112 directly, via the network 106, or via a third-party system. For example, the client device 104 may access the game networking system 112 via the social networking system 108. The client device 104 may be any suitable computing device, such as a personal computer, laptop, cellular phone, smart phone, computing tablet, etc.

The social networking system 108 may include a network-addressable computing system that can host one or more social graphs (see for example FIG. 2), and may be accessed by the other components of gaming platform 100 either directly or via the network 106. The social networking system 108 may generate, store, receive, and transmit social networking data.

Figure 2:
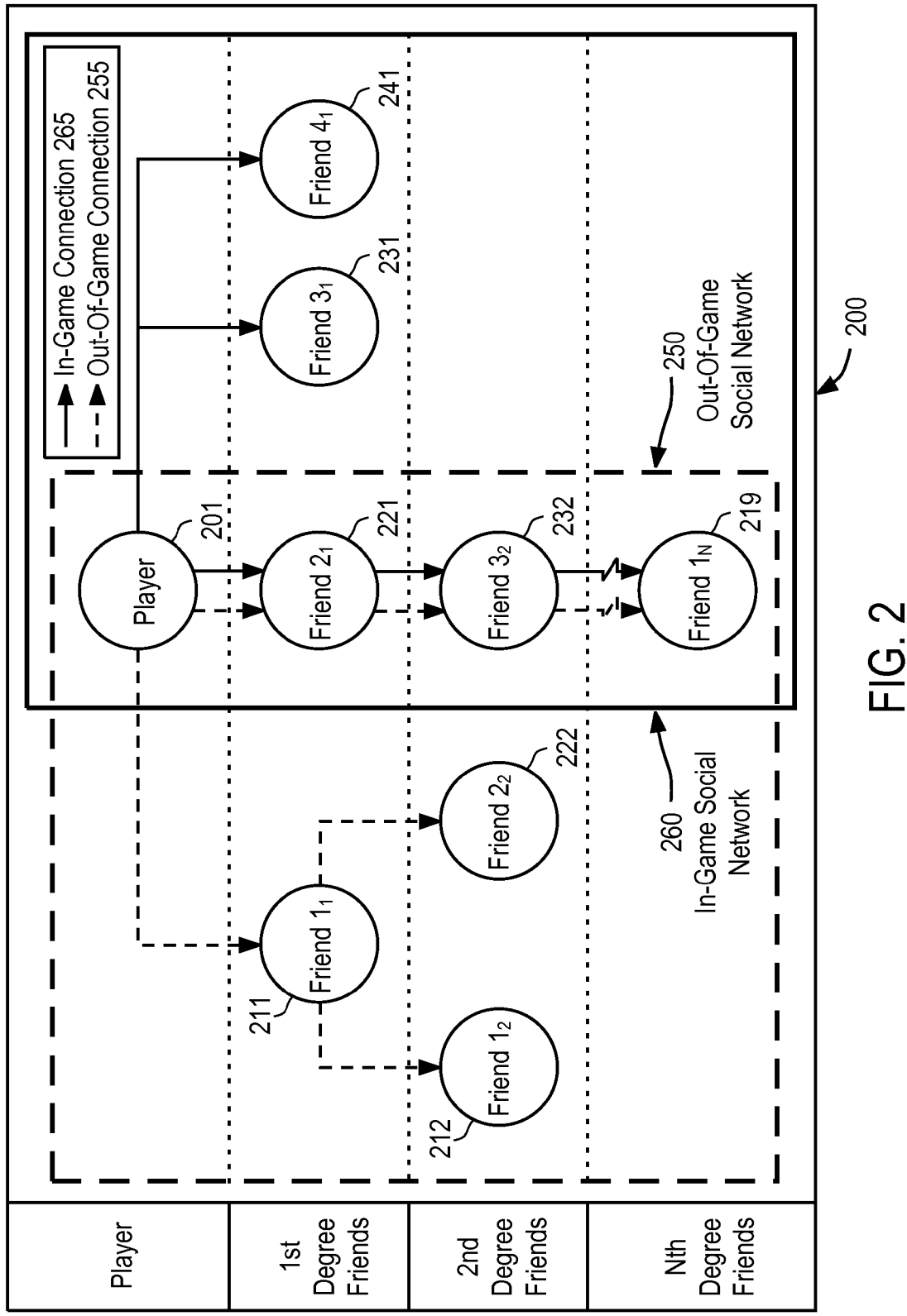
FIG. 2 shows an example of a social network within a social graph, according to an example embodiment.

FIG. 2 shows an example of a social network within a social graph 200. Social graph 200 is shown by way of example to include an out-of-game social network 250, and an in-game social network 260. Moreover, in-game social network 260 may include one or more users that are friends with Player 201 (e.g., Friend 231), and may include one or more other users that are not friends with Player 201. The social graph 200 may correspond to the various users associated with the virtual game. In an example embodiment, each user may "build" their own virtual structures using branded virtual objects and/or unbranded virtual objects. When, for example, Player 201 visits the virtual environment of Friend 231, the virtual environment displayed to Player 201 includes banded objects selected and placed in that environment by Friend 231.

With reference back to FIG. 1, the game networking system 112 may include a network-addressable computing system (or systems) that can host one or more virtual games, for example, online games. The game networking system 112 may generate, store, receive, and transmit game-related data, such as, for example, game account data, game input, game state data, and game displays. The game networking system 112 may be accessed by the other components of gaming platform 100 either directly or via the network 106. The user 102 may use the client device 104 to access, send data to, and receive data from the social networking system 108 and/or the game networking system 112.

Figure 3:
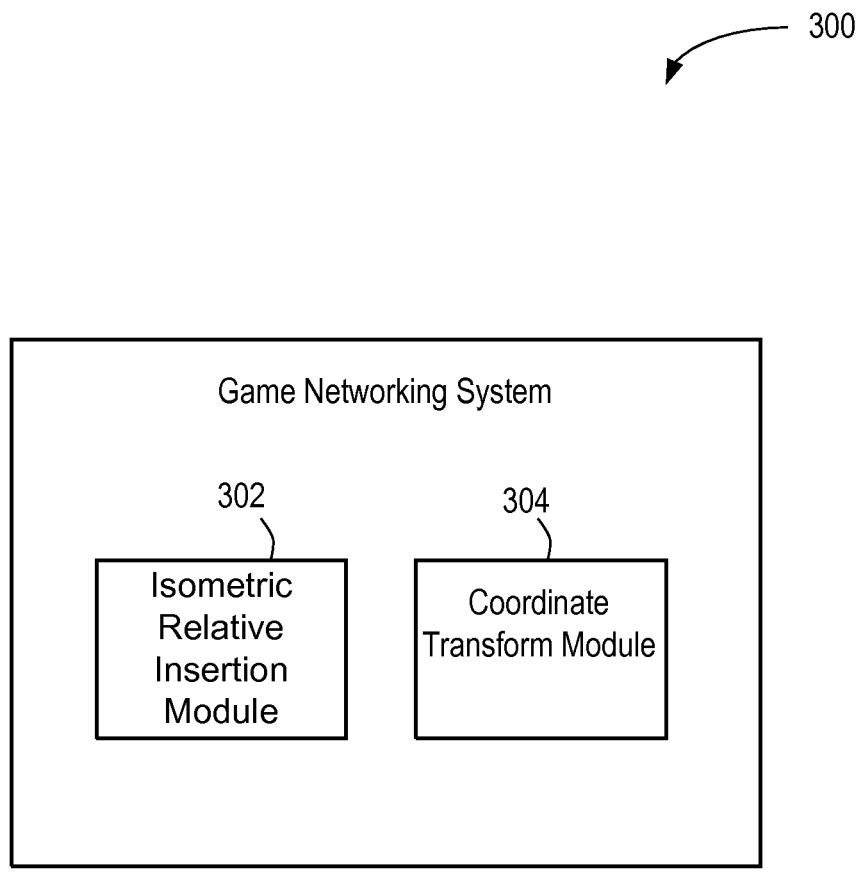
FIG. 3 is a block diagram showing modules of a processor system that may provide 3D operations in an isometric projection, according to an example embodiment.

Example modules that may be used by the components shown in FIG. 1 are now described. FIG. 3 is a block diagram showing modules of a processor system 300 that may provide 3D operations in an isometric projection. For example, FIG. 3 shows that the processing system 300 may include an isometric relative insertion module 302 and a coordinate transform module 304. The isometric relative insertion module 302 may be a computer-implemented module configured to perform operations related to placing game objects relative to the surface area of other game objects shown in an isometric projection.

The coordinate transform module 304 may be configured to perform operations related to adjusting the display angle of an isometric projection. To adjust the angle of the isometric projection, the coordinate transform module 304 may perform operations to convert isometric coordinates to Cartesian coordinates, and vice versa.

The operation of the isometric relative insertion module 302 and the coordinate transform module 304 are described in greater detail below, with reference to FIGS. 4-12.

Figure 4:
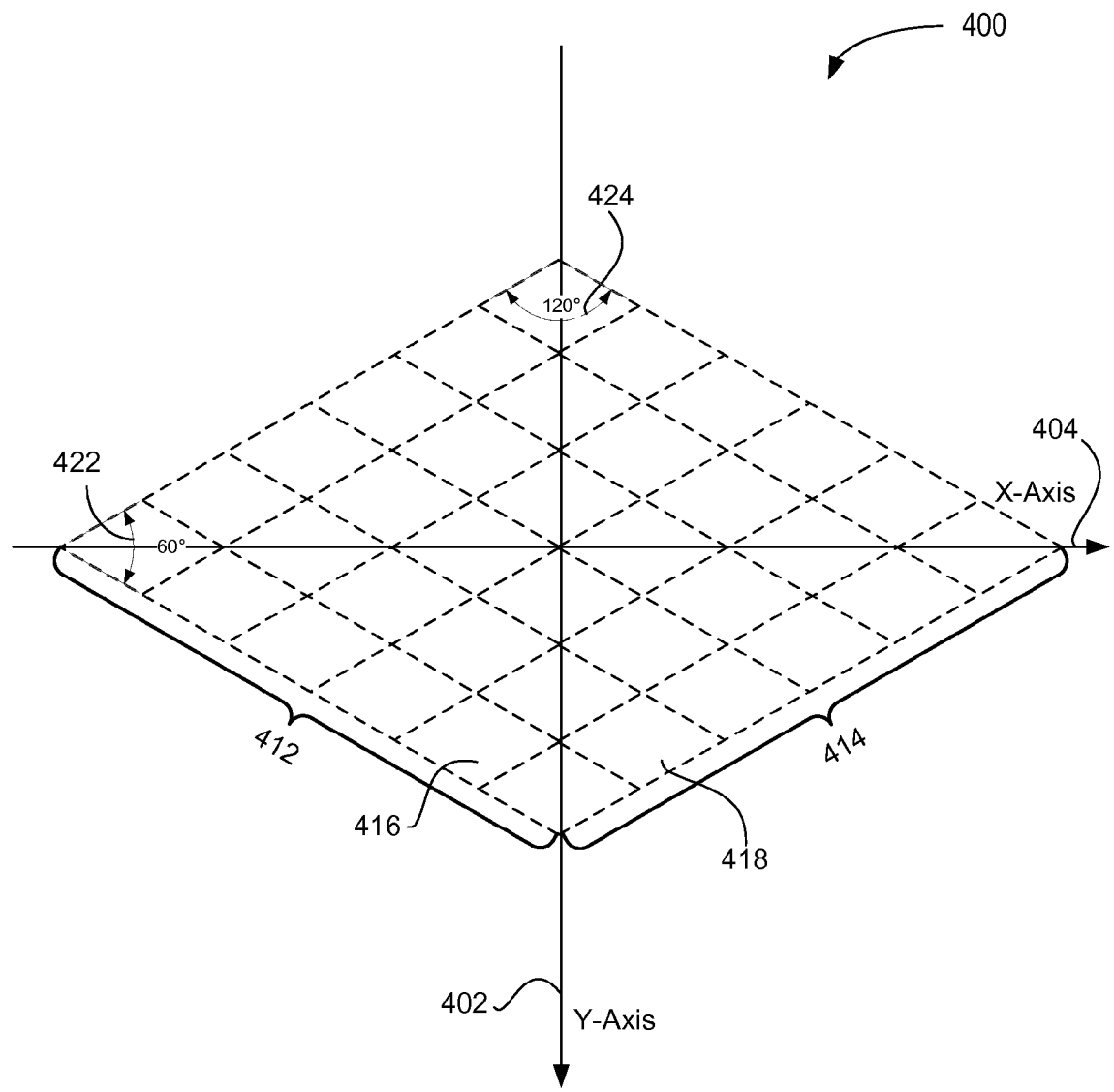
FIG. 4 is a diagram illustrating an example of an isometric projection of a virtual environment, according to an example embodiment.

As described above, example embodiments may provide systems and methods for inserting objects relative to the surface of other objects in an isometric projection. For the purpose of illustration and not limitation, FIG. 4 is a diagram illustrating an example of an isometric projection of a virtual environment 400, according to an example embodiment. In the isometric projection illustrated by FIG. 4, the virtual environment 400 may be projected on a 2D Cartesian coordinate system that includes a vertical Y-axis 402 and a horizontal X-axis 404. It is to be appreciated that the 2D Cartesian coordinate system is a coordinate system used to render images of the virtual environment 400 and the game objects located within the virtual environment 400 and to process data received as user inputs, such as mouse clicks and so forth. It is to be appreciated that, in some embodiments, the 2D Cartesian coordinate system is not actually displayed to the player playing the game.

The virtual environment 400 may represent a grid of tiles that are oriented according to a determinable angle with respect to the X-axis 404 and Y-axis 402. For example, angle 422 may be 60 degrees and angle 424 may be 120 degrees. It is to be appreciated that the angle opposite to angle 422 may also be 60 degrees and the angle opposite to angle 424 may also be 120 degrees. It is to be appreciated that edges 412, 414 may form an axis for a parallel projection coordinate system. For example, edge 412 may form a Y'-axis and edge 414 may form an X'-axis. Accordingly, tiles or cells within the grid of the virtual environment 400 may be expressed in terms of (x', y') according to the parallel projection coordinate system. For example, tile 416 may correspond to position (0', 1') and tile 418 may correspond to position (1',0'). To avoid confusion between coordinates expressed according to a perpendicular coordinate system (e.g., Cartesian coordinate system) and a parallel coordinate system (e.g., isometric coordinate system), the perpendicular coordinate system may be generally expressed in terms of (x, y), while the parallel coordinate system may be generally expressed in terms of (x', y').

Consistent with example embodiments contemplated by this disclosure, it is to be appreciated that other example embodiments aside from the example embodiment shown in FIG. 4 may provide different virtual environments. For example, the angles 442 and 424 may differ, or the number of tiles or cells within the virtual environment may be more or less.

Figure 5:
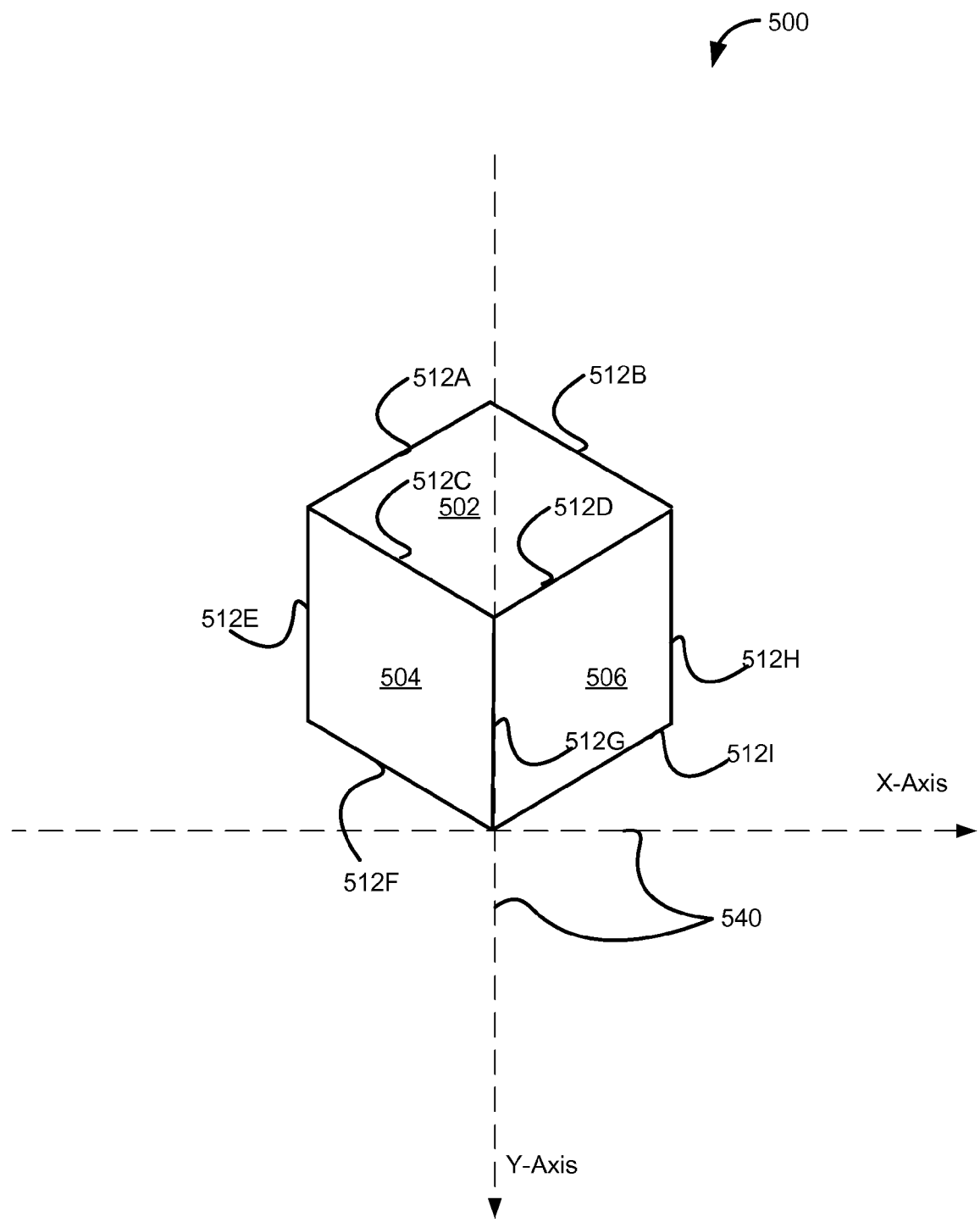
FIG. 5 is a diagram illustrating a game object that may be placed within a parallel projection of a virtual environment, according to an example embodiment.

Some embodiments may allow a player to place game objects within the virtual environment 400 by selecting (e.g., "clicking" on a mouse button) a tile or cell within the virtual environment. For example, some virtual games may present an inventory of different game objects (e.g., game objects representing blocks, furniture, building materials, landscaping items, walls, and the like) that a player may select. Once a game object is selected by the player, the player may then place the game object within the virtual environment. By way of example and not limitation, FIG. 5 is a diagram illustrating a game object 500 that may be placed within a parallel projection of a virtual environment, according to an example embodiment. The game object 500 may be a graphical representation of an object bounded in 2D space by, for example, a representation of a cube, cuboid, or any other 3D object. For example, in some embodiments, the game object may be bounded by line segments 512A-D, defining a top surface 502 for the game object 500; line segments 512C, E-G, defining a front-left surface 504; and line segments 512D, G-I, defining a front-right surface 506. Although not shown in FIG. 5, some embodiments may depict pre-rendered images of materials (e.g., wood, glass, tile, brick, grass, sand, water, fencing, walls, windows, and the like) or an image of an object, such as landscaping items (e.g., trees, poles, bridges, and the like), furniture, or any other suitable item.

As FIG. 5 illustrates, the game object 500 may be expressed within a coordinate system 540, such as a Cartesian coordinate system. For example, the coordinate system 540 may be a perpendicular projection in 2D space, according to a Y-axis and an X-axis. Accordingly, each of the line segments 512A-I may be expressed according the following function:

$$y=mx+b$$

Where y is the y coordinate (e.g., as measured by the Y-axis), m is the slope of the line segment, x is the x coordinate (e.g., as measured by the X-axis), and b is the y-intercept.

Figure 6:
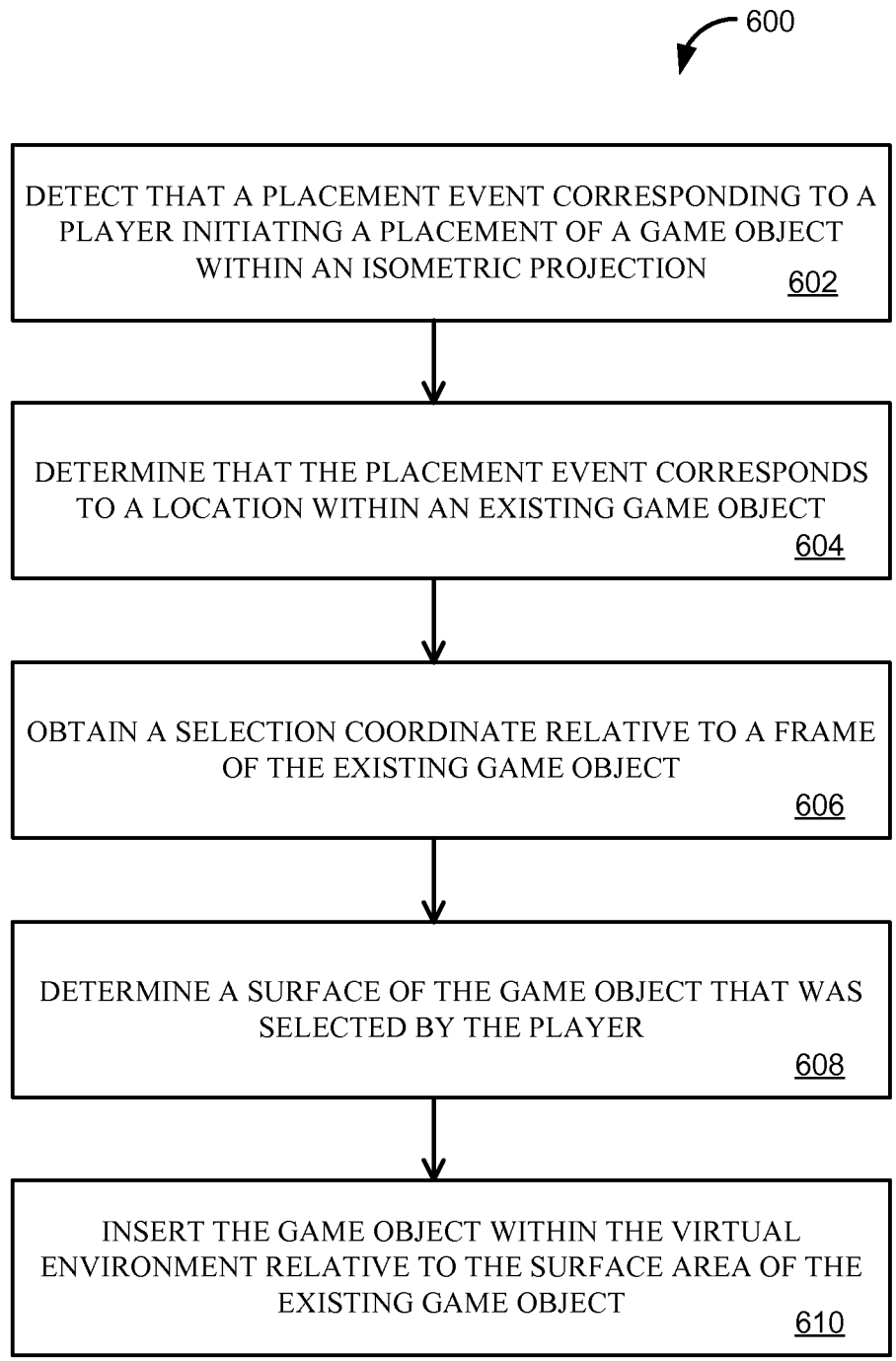
FIG. 6 is a flow chart diagram illustrating a method of placing a game object in an isometric projection of a virtual environment relative to another game object, according to an example embodiment.

FIG. 6 is a flow chart diagram illustrating a method 600 of placing a game object in an isometric projection of a virtual environment relative to another game object, according to an example embodiment. The method 600 may, in some embodiments, be performed by the systems, components, and modules shown in FIGS. 1 and 3. Accordingly, for the purpose of clarity of description, the method 600 will be described with reference to the isometric relative insertion module 302 of FIG. 3.

As FIG. 6 illustrates, the method 600 may begin at operation 602 when the isometric relative insertion module 302 detects a placement event corresponding to the placement of a game object within an isometric projection of a virtual environment. For example, consistent with operation 602, a player may operate a mouse to place an onscreen pointer to a location within the virtual environment being presented by a game system. The placement event may be initiated by the player in response to the player clicking on a mouse button, tapping on a touchscreen, or the like. In some embodiments, the placement event may specify a global view location, as may be represented using the coordinates system associated with the virtual environment (e.g., the coordinate system expressed by the Y-axis 402 and the X-axis 404 shown in FIG. 4).

Figure 7:
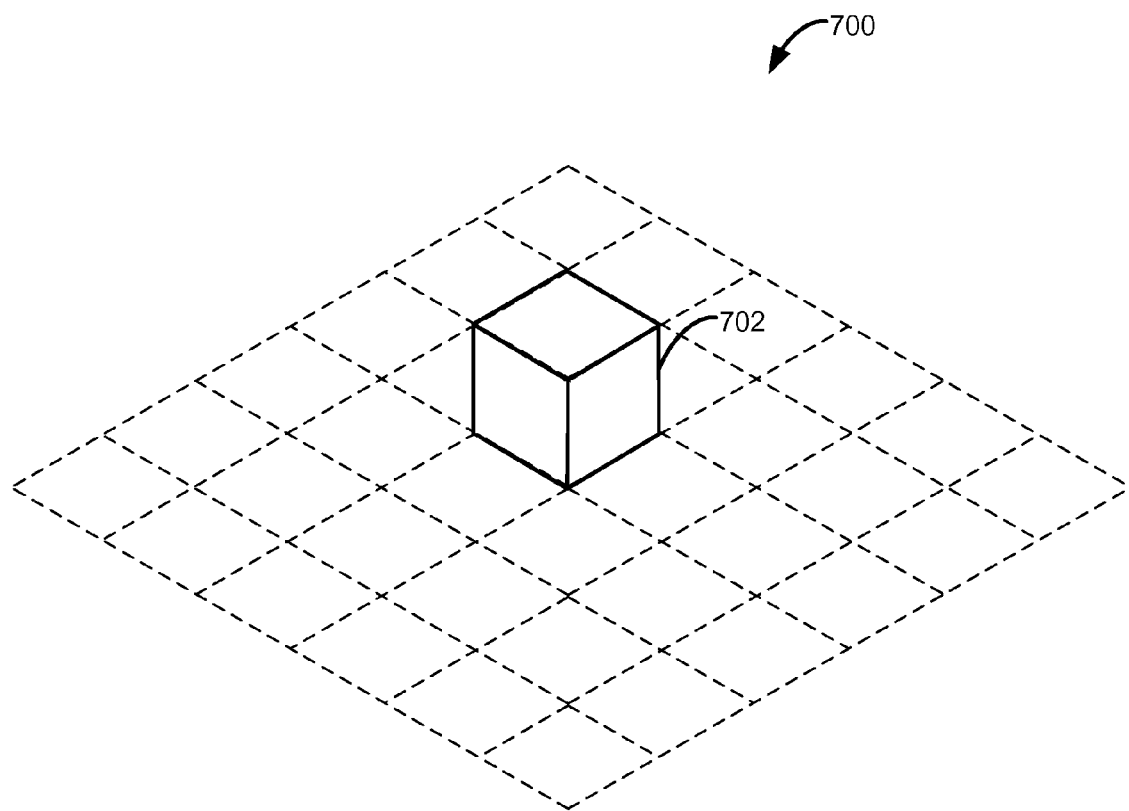
FIG. 7 illustrates a virtual environment with an existing game object, according to an example embodiment.

At operation 604 the isometric relative insertion module 302 may determine that the placement event corresponds to a location within an existing game object. For example, the isometric relative insertion module 302 may determine whether the global view location specified by the placement event is within the boundary of an existing game object. For example, FIG. 7 illustrates a virtual environment 700 with an existing game object 702, according to an example embodiment. Accordingly, operation 604 may involve the isometric relative insertion module 302 determining that the global view location is within a boundary formed by the line segments of the existing game object 702. It is to be appreciated that in some embodiment, the existing game object 702 may have been previously placed by the player when the player selected a particular tile of the virtual environment.

By way of example and not limitation, with temporary reference to FIG. 5, the boundary of the existing game object 702 may be calculated based on whether the global view location is within the line segments 512A, B, E, F, H, I of FIG. 5.

With reference back to FIG. 6, responsive to determining that the placement event corresponds to a location within the existing game object, the isometric relative insertion module 302 may then obtain a selection coordinate relative to a view frame local to the existing game object. This is shown as operation 606. The local location may be point in a Cartesian coordinate system oriented with respect to the game object. For example, the isometric relative insertion module 302 may use the Y-axis and the X-axis used to express the game object 500 of FIG. 5.

Continuing with FIG. 6, at operation 608, the isometric relative insertion module 302 may then compare the local location to the line segments of the game object to determine which surface of the game object was selected by the player. With temporary reference to FIG. 5, for example, assuming the local location is expressed in terms of (local x, local y), if the local x coordinate is less than the line segment 512G and the local y coordinate is below the line segment 512C, the isometric relative insertion module 302 may determine that the front-left surface 504 was selected by the player. If, instead, the local x coordinate is greater than or equal to the line segment 512G and the local y coordinate is below the line segment 512D, the isometric relative insertion module 302 may determine that the front-right surface 506 was selected by the player. However, if the selected surface is not the front-left surface 504 or the front-right surface 506, the isometric relative insertion module 302 may determine that the top surface 502 was selected by the player.

In some example embodiments, the isometric relative insertion module 302 may determine that a given local location is below a line segment (e.g., expressed as y=mx+b) using the following equation:

$$Ay>m*Ax+b$$

Where, in the above equation, Ay is the local y coordinate, m is the slope of the line segment, Ax is the local x coordinate, and b is the y intercept of the of the line segment.

At operation 610, the isometric relative insertion module 302 may then insert a game object within the virtual environment relative to the surface of the existing game object. In some embodiments, the isometric relative insertion module 302 may maintain a game object position data structure to track the relative positioning of the game objects in the isometric virtual environment. Such a game object position data structure may be associated with game objects having positioning data in the form of: (x', y', z'), where x', y' and z' specify an isometric cell within the isometric grid. In some embodiments, the position data for an inserted game object may be a function of the positioning data of the existing game object. For the purpose of illustration, this discussion assumes that the existing game object's positioning data is (x', y', z). Where a game object is inserted on the left front surface of another game object, the isometric relative insertion module 302 may assign the newly inserted game object with the following position data: (x', y'+1, z'). Where the game object is inserted on the right-front surface of another game object, the isometric relative insertion module 302 may assign the newly inserted game object with the following position data: (x'+1, y', z'). Where the game object is inserted on the top surface of another game object, the isometric relative insertion module 302 may assign the newly inserted game object with the following position data: (x', y', z'+1).

Figure 8:
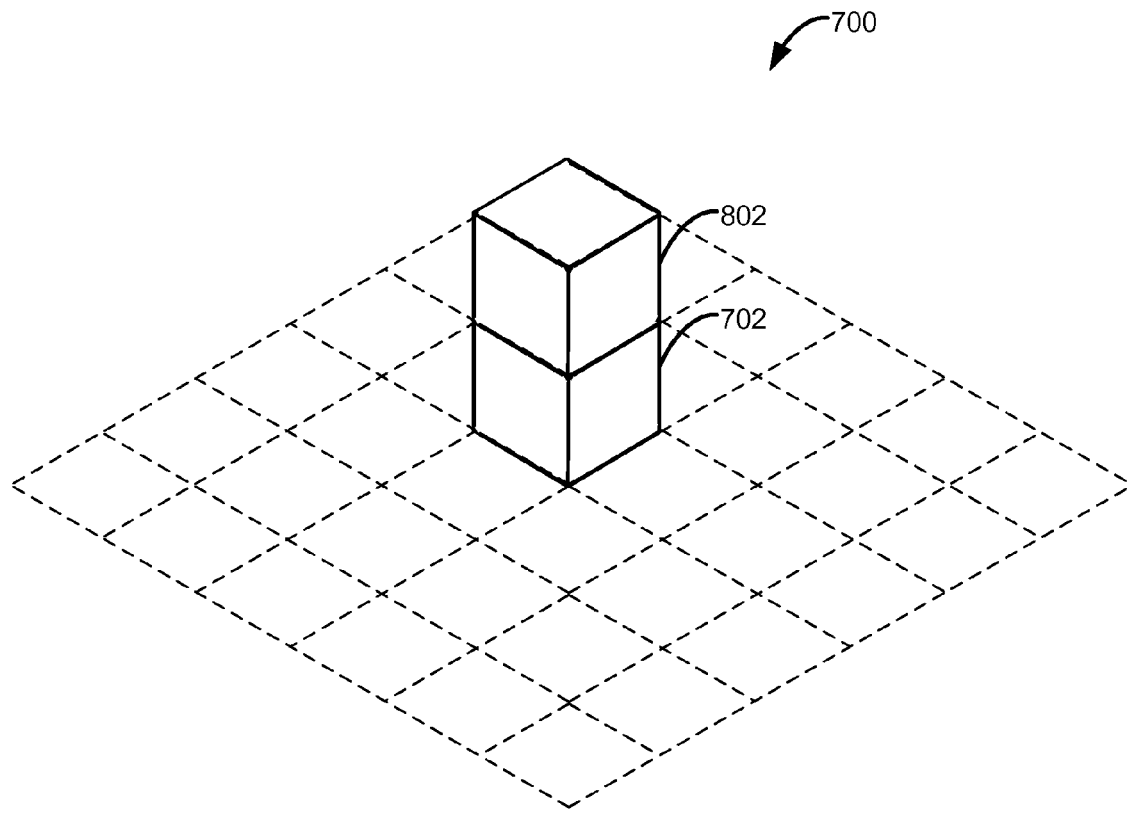
FIGS. 8 and 9 are diagrams illustrating the isometric projection of a virtual environment of FIG. 7 where game objects are inserted relative to existing game objects, according to example embodiments.
Figure 9:
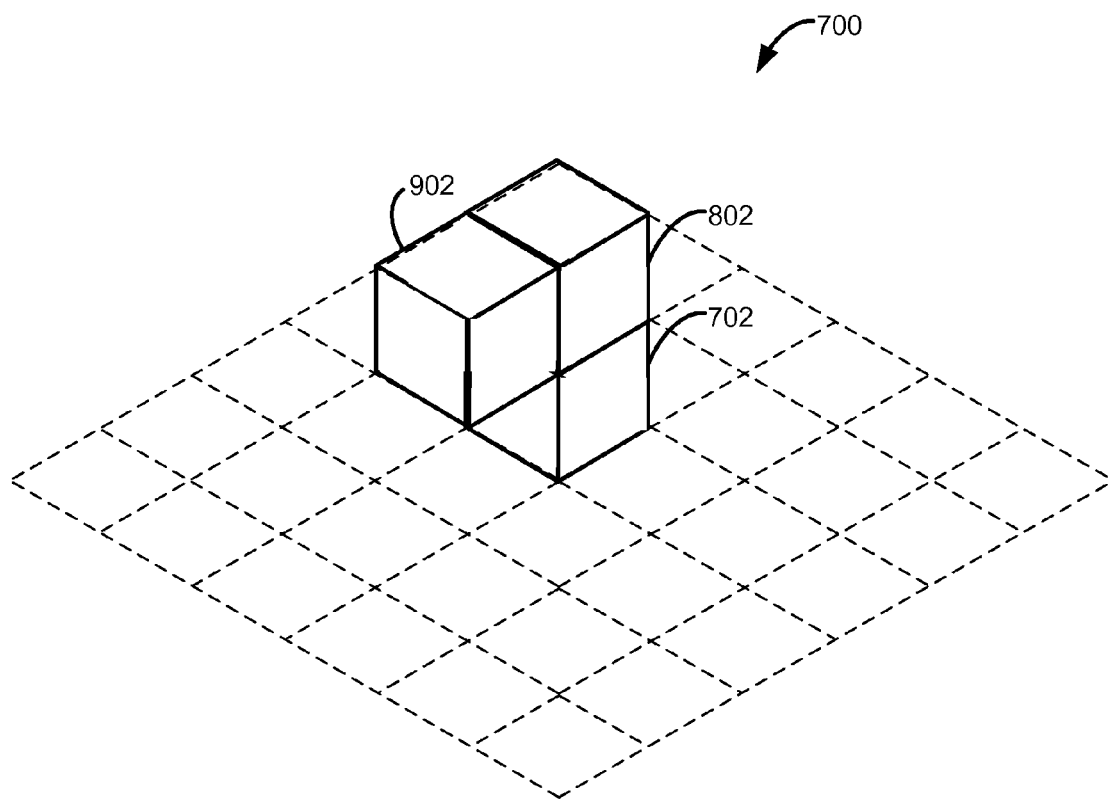

FIGS. 8 and 9 are diagrams illustrating an isometric projection of the virtual environment 700 of FIG. 7 where game objects are inserted relative to existing game objects, according to example embodiments. For example, FIG. 8 is a diagram illustrating a game object 802 being inserted relative to the existing game object 702. As an example embodiment, the existing game object 702 may be associated with position data representing (0, 0, 0). The game object 802 may have been inserted responsive to the player selecting the top surface of the existing game object 702. Accordingly, the game object 802 may be associated with position data represented by (0, 0, 1). As FIG. 8 shows, the game object 802 is displayed over the existing game object 702 to provide an effect that the game object 802 rests on top of the existing game object 702.

Still further, FIG. 9 is a diagram illustrating another game object 902 being inserted relative to the game object 802 of FIG. 8. The game object 902 may have been inserted responsive to the player selecting the front left surface of the game object 802. Accordingly, the game object 902 may be associated with position data represented by (0, 1, 1). As FIG. 9 shows, the game object 902 is displayed over the existing game object 702 and the game object 802 to provide an effect that the game object 902 is attached to the front left surface of the game object 802, which, in turn, rests on top of the existing game object 702. The order in which the different game objects are rendered within the virtual environment may be a function of the respective (x', y', z') coordinates. For example, game object with a lower z' value may be rendered before game objects with higher z' value.

In some embodiments, game objects can be inserted on the other sides of the cube by rotating the grid. A cell at position (a, b, z) on the grid can be rotated around the z axis by resetting the position to (−b, a, z), angle of rotation would be 90 degrees. Such a rotational transformation may be used by example embodiments and other embodiments may utilize other rotational transformations known in the art.

Figure 10:
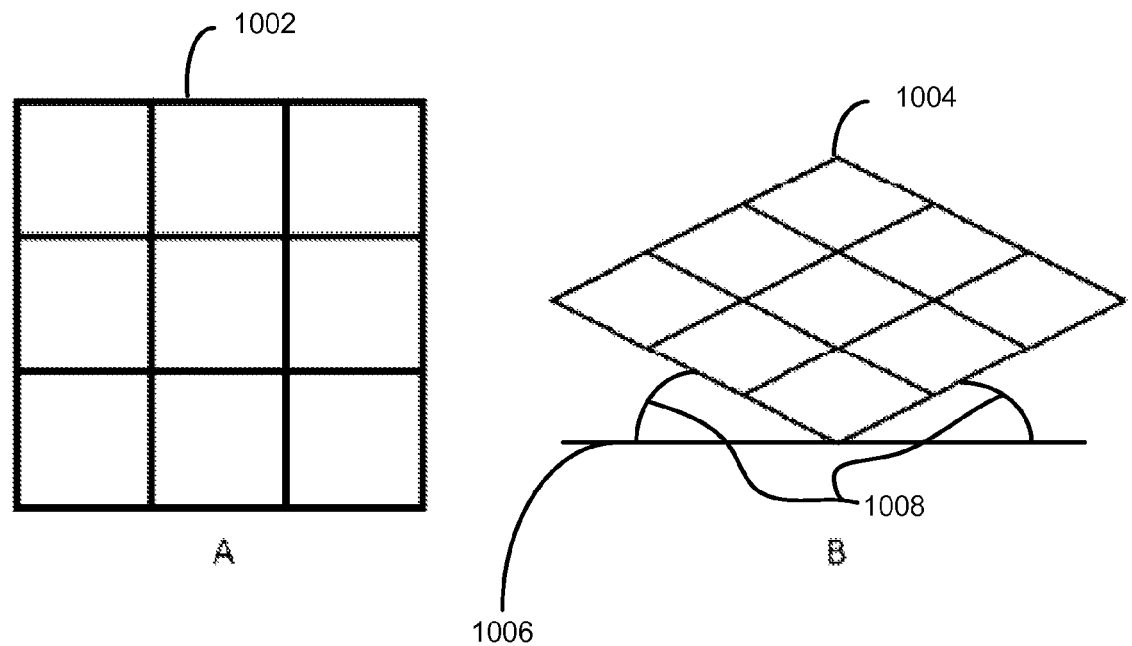
FIG. 10 is a diagram that depicts a Cartesian grid and an isometric grid, according to an example embodiment.

In addition, or alternative, to inserting game objects relative to other game objects, some embodiments described herein may adjust the angle of view of an isometric projection by, for example, converting to Cartesian coordinates, and vice versa. FIG. 10 is a diagram that depicts a Cartesian grid 1002 and an isometric grid 1004. In particular, relative to the line 1006, the isometric grid may represent the Cartesian grid rotated by a determinable angle 1008 (e.g., 30 degrees or 26.5 degrees). According to example embodiments, the coordinate transform module 304 transform coordinates that correspond to the Cartesian grid 1002 to the isometric grid 1008 with determinable angles 1008, and vice versa.

Figure 11:
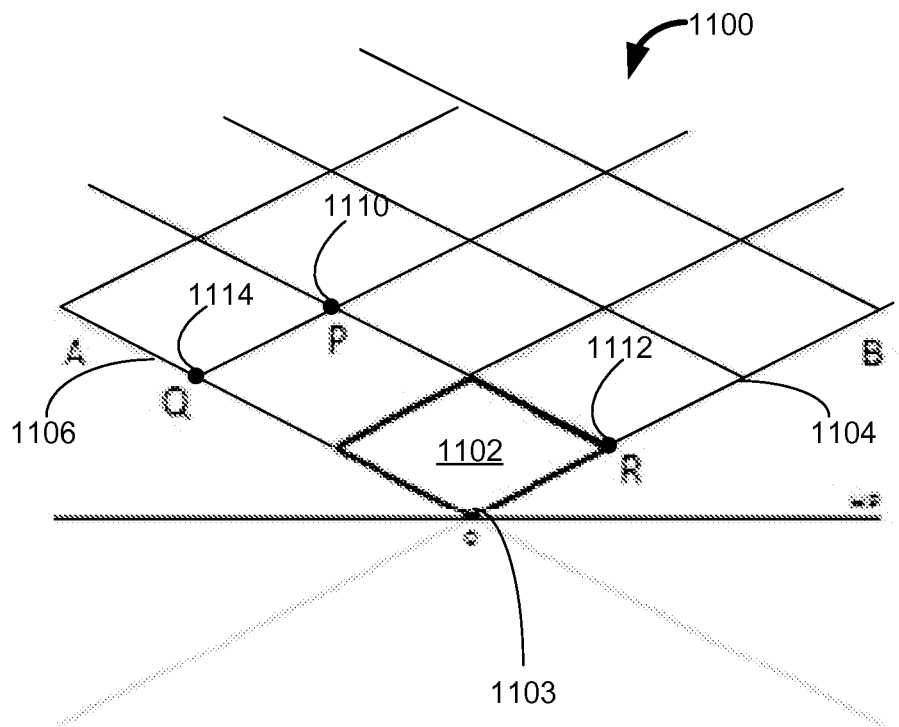
FIG. 11 is a diagram that illustrates a Cartesian-isometric transformation that may be implemented, for example, by the coordinate transform module of FIG. 3.

FIG. 11 is a diagram that illustrates a Cartesian-isometric transformation that may be implemented, for example, by the coordinate transform module 304 of FIG. 3. For example, FIG. 11 shows an isometric cell 1102 of an isometric grid 1100, where the isometric cell 1102 is positioned such that a vertex 1103 of the cell is positioned at the origin of the isometric grid 1100. FIG. 11 further shows two lines (lines 1104 and 1106) passing over the bottom edges of the isometric cell 1102.

Conceptually, the coordinate transform module 304 may find the Cartesian coordinate of a point 1110 by calculating the distance of the point 1110 from a point 1112 on the line 1104, and a point 1114 on the line 1106. In words, the Cartesian coordinates of an isometric point can be found by measuring the length of line segments starting from the point with the other end respectively touching the lines passing through the origin making an angle with HP same as that of the cell. The line segments may be parallel to the other's line.

In some embodiments, the coordinate transform module 304 may calculate Isometric-to-Cartesian coordinates with the following equations:

$$PR=(X+Py)/D$$

$$PQ=(Py-X)/D$$

where $$X=Px*T$$

In the above formulas, the value PR may refer to tile position over the X-axis in Cartesian system, X may refer to XTngent, Py may refer to y-coordinate of current pointer position in isometric system, PQ may refer to tile position over Y-axis, and Px may refer to x-coordinate of pointer position. Further, the values of T (Tangent) and D (Divisor Factor) may be constant for a specific cell size and can be pre-calculated as follows:

$$T=Ch/Cw$$

$$D=Ch/S$$

The above equations mainly help to convert mouse position on an isometric-board into the respective Cartesian coordinates. It is to be appreciated that these equations allow comparatively efficient processing as, in some embodiment, the processing and data storage may utilize Cartesian coordinates.

Figure 12:
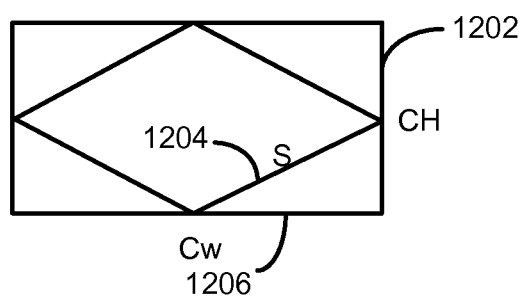
FIG. 12 is a diagram illustrating relationship between an isometric and a Cartesian cell that is usable to calculate T and D, according to an example embodiment.

The values of T and D may be calculated based on dimensions of an isometric tile used in the game. FIG. 12 is a diagram illustrating dimensions of an isometric tile/asset/image that is usable to calculate T and D, according to an example embodiment. As shown in FIG. 12, Ch may refer to an isometric tile height (line segment 1202) and CW (line segment 1206) may refer to an isometric tile width. Further S (line segment 1204) may refer to the length of a side of an isometric cell. This helps to create maps of isometric tiles while minimizing the mathematical computations. That is, provided that the height and width of tile image is known, example embodiments may takes care of the positioning.

Equations for Cartesian-to-Isometric coordinates are as follows, they calculate a tile's position on the isometric board from the tile data.

$$Py=D*(PR+PQ)/2$$

$$Px=(PR*D-Py)/T$$

These new equations may allow example embodiments to implement a generic system that could render Isometric maps with tiles of any dimensions. For example, a tile can have any width and height, unlike the conventional system that require tiles with a width:height ratio of 2:1. In some embodiments, the coordinate transform module 304 may limit that the tiles in a single screen share the same ratio. Further, the above equations account for vertically flipped quadrants often used in computer graphics.

Embodiments utilizing the coordinate transform module 304 may allow users to create virtual environments that are viewable according to various camera positions (e.g., higher or lower). Such angle positions may allow the virtual environment to show more or less data/cells than the conventional maps.

Example Game Systems, Social Networks, and Social Graphs

As described above, the systems described herein may include, communicate, or otherwise interact with a game system. As such, a game system is now described to illustrate further embodiments. In an online multiuser game, users control player characters (PCs), a game engine controls non-player characters (NPCs), and the game engine also manages player character state and tracks states for currently active (e.g., online) users and currently inactive (e.g., offline) users. A game engine, in some embodiments, may include a documentation engine. Alternatively, the documentation engine and game engine may be embodied as separate components operated by the game network system and/or the document provision system.

A player character may have a set of attributes and a set of friends associated with the player character. As used herein, the terms "state" and "attribute" can be used interchangeably to refer to any in-game characteristic of a player character, such as location, assets, levels, condition, health, status, inventory, skill set, name, orientation, affiliation, specialty, and so on. The game engine may use a player character state to determine the outcome of a game event, sometimes also considering set variables or random variables. Generally, an outcome is more favorable to a current player character (or player characters) when the player character has a better state. For example, a healthier player character is less likely to die in a particular encounter relative to a weaker player character or non-player character.

A game event may be an outcome of an engagement, a provision of access, rights and/or benefits or the obtaining of some assets (e.g., health, money, strength, inventory, land, etc.). A game engine may determine the outcome of a game event according to game rules (e.g., "a character with less than 5 health points will be prevented from initiating an attack"), based on a character's state and possibly also interactions of other player characters and a random calculation. Moreover, an engagement may include simple tasks (e.g., cross the river, shoot at an opponent), complex tasks (e.g., win a battle, unlock a puzzle, build a factory, rob a liquor store), or other events.

In a game system according to aspects of the present disclosure, in determining the outcome of a game event in a game being played by a user (or a group of more than one users), the game engine may take into account the state of the player character (or group of PCs) that is playing, but also the state of one or more PCs of offline/inactive users who are connected to the current user (or PC, or group of PCs) through the game social graph but are not necessarily involved in the game at the time.

For example, User A with six friends on User A's team (e.g., the friends that are listed as being in the user's mob/gang/set/army/business/crew/etc. depending on the nature of the game) may be playing the virtual game and choose to confront User B who has 20 friends on User B's team. In some embodiments, a user may only have first-degree friends on the user's team. In other embodiments, a user may also have second-degree and higher degree friends on the user's team. To resolve the game event, in some embodiments the game engine may total up the weapon strength of the seven members of User A's team and the weapon strength of the 21 members of User B's team and decide an outcome of the confrontation based on a random variable applied to a probability distribution that favors the side with the greater total. In some embodiments, all of this may be done without any other current active participants other than User A (e.g., User A's friends, User, B, and User B's friends could all be offline or inactive). In some embodiments, the friends in a user's team may see a change in their state as part of the outcome of the game event. In some embodiments, the state (assets, condition, level) of friends beyond the first degree are taken into account.

Example Game Networking Systems

A virtual game may be hosted by the game networking system 112, which can be accessed using any suitable connection 110 with a suitable client device 104. A user may have a game account on the game networking system 112, wherein the game account may contain a variety of information associated with the user (e.g., the user's personal information, financial information, purchase history, player character state, game state, etc.). In some embodiments, a user may play multiple games on the game networking system 112, which may maintain a single game account for the user with respect to the multiple games, or multiple individual game accounts for each game with respect to the user. In some embodiments, the game networking system 112 may assign a unique identifier to a user 102 of a virtual game hosted on the game networking system 112. The game networking system 112 may determine that the user 102 is accessing the virtual game by reading the user's cookies, which may be appended to HTTP requests transmitted by the client device 104, and/or by the user 102 logging onto the virtual game.

In some embodiments, the user 102 accesses a virtual game and control the game's progress via the client device 104 (e.g., by inputting commands to the game at the client device 104). The client device 104 can display the game interface, receive inputs from the user 102, transmit user inputs or other events to the game engine, and receive instructions from the game engine. The game engine can be executed on any suitable system (such as, for example, the client device 104, the social networking system 108, or the game networking system 112). For example, the client device 104 may download client components of a virtual game, which are executed locally, while a remote game server, such as the game networking system 112, provides backend support for the client components and may be responsible for maintaining application data of the game, processing the inputs from the user 102, updating and/or synchronizing the game state based on the game logic and each input from the user 102, and transmitting instructions to the client device 104. As another example, when the user 102 provides an input to the game through the client device 104 (such as, for example, by typing on the keyboard or clicking the mouse of the client device 104), the client components of the game may transmit the user's input to the game networking system 112.

In some embodiments, the user 102 accesses particular game instances of a virtual game. A game instance is a copy of a specific game play area that is created during runtime. In some embodiments, a game instance is a discrete game play area where one or more users 102 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables.

In some embodiments, a specific game instance may be associated with one or more specific users. A game instance is associated with a specific user when one or more game parameters of the game instance are associated with the specific user. For example, a game instance associated with a first user may be named "First User's Play Area." This game instance may be populated with the first user's PC and one or more in-game objects associated with the first user.

In some embodiments, a game instance associated with a specific user is only accessible by that specific user. For example, a first user may access a first game instance when playing a virtual game, and this first game instance may be inaccessible to all other users. In other embodiments, a game instance associated with a specific user is accessible by one or more other users, either synchronously or asynchronously with the specific user's game play. For example, a first user may be associated with a first game instance, but the first game instance may be accessed by all first-degree friends in the first user's social network.

In some embodiments, the set of in-game actions available to a specific user is different in a game instance that is associated with this user compared to a game instance that is not associated with this user. The set of in-game actions available to a specific user in a game instance associated with this user may be a subset, superset, or independent of the set of in-game actions available to this user in a game instance that is not associated with him. For example, a first user may be associated with Blackacre Farm in an online farming game, and may be able to plant crops on Blackacre Farm. If the first user accesses a game instance associated with another user, such as Whiteacre Farm, the game engine may not allow the first user to plant crops in that game instance. However, other in-game actions may be available to the first user, such as watering or fertilizing crops on Whiteacre Farm.

In some embodiments, a game engine interfaces with a social graph. Social graphs are models of connections between entities (e.g., individuals, users, contacts, friends, users, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In some embodiments, a unique client identifier may be assigned to individual users in the social graph. This disclosure assumes that at least one entity of a social graph is a user or player character in an online multiuser game.

In some embodiments, the social graph is managed by the game networking system 112, which is managed by the game operator. In other embodiments, the social graph is part of a social networking system 108 managed by a third party (e.g., Facebook, Friendster, Myspace). In yet other embodiments, the user 102 has a social network on both the game networking system 112 and the social networking system 108, wherein the user 102 can have a social network on the game networking system 112 that is a subset, superset, or independent of the user's social network on the social networking system 108. In such combined systems, game network system 112 can maintain social graph information with edge-type attributes that indicate whether a given friend is an "in-game friend," an "out-of-game friend," or both. The various embodiments disclosed herein are operable when the social graph is managed by the social networking system 108, the game networking system 112, or both.

Example Systems and Methods

Returning to FIG. 2, the User 201 may be associated, connected or linked to various other users, or "friends," within the out-of-game social network 250. These associations, connections or links can track relationships between users within the out-of-game social network 250 and are commonly referred to as online "friends" or "friendships" between users. Each friend or friendship in a particular user's social network within a social graph is commonly referred to as a "node." For purposes of illustration, the details of out-of-game social network 250 are described in relation to User 201. As used herein, the terms "user" and "player" can be used interchangeably and can refer to any user in an online multiuser game system or social networking system. As used herein, the term "friend" can mean any node within a user's social network.

As shown in FIG. 2, User 201 has direct connections with several friends. When User 201 has a direct connection with another individual, that connection is referred to as a first-degree friend. In out-of-game social network 250, User 201 has two first-degree friends. That is, User 201 is directly connected to Friend $1_1$ 211 and Friend $2_1$ 221. In social graph 200, it is possible for individuals to be connected to other individuals through their first-degree friends (e.g., friends of friends). As described above, the number of edges in a minimum path that connects a user to another user is considered the degree of separation. For example, FIG. 2 shows that User 201 has three second-degree friends to which User 201 is connected via User 201's connection to User 201's first-degree friends. Second-degree Friend $1_2$ 212 and Friend $2_2$ 222 are connected to User 201 via User 201's first-degree Friend $1_1$ 211. The limit on the depth of friend connections, or the number of degrees of separation for associations, that User 201 is allowed is typically dictated by the restrictions and policies implemented by the social networking system 108.

In various embodiments, User 201 can have Nth-degree friends connected to him through a chain of intermediary degree friends as indicated in FIG. 2. For example, Nth-degree Friend $1_N$ 219 is connected to User 201 within in-game social network 260 via second-degree Friend $3_2$ 232 and one or more other higher-degree friends.

In some embodiments, a user (or player character) has a social graph within an online multiuser game that is maintained by the game engine and another social graph maintained by a separate social networking system. FIG. 2 depicts an example of in-game social network 260 and out-of-game social network 250. In this example, User 201 has out-of-game connections 255 to a plurality of friends, forming out-of-game social network 250. Here, Friend $1_1$ 211 and Friend $2_1$ 221 are first-degree friends with User 201 in User 201's out-of-game social network 250. User 201 also has in-game connections 265 to a plurality of users, forming in-game social network 260. Here, Friend $2_1$ 221, Friend $3_1$ 231, and Friend $4_1$ 241 are first-degree friends with User 201 in User 201's in-game social network 260. In some embodiments, a game engine can access in-game social network 260, out-of-game social network 250, or both.

In some embodiments, the connections in a user's in-game social network is formed both explicitly (e.g., when users "friend" each other) and implicitly (e.g., when the system observes user behaviors and "friends" users to each other). Unless otherwise indicated, reference to a friend connection between two or more users can be interpreted to cover both explicit and implicit connections, using one or more social graphs and other factors to infer friend connections. The friend connections can be unidirectional or bidirectional. It is also not a limitation of this description that two users who are deemed "friends" for the purposes of this disclosure are not friends in real life (e.g., in disintermediated interactions or the like), but that could be the case.

Figure 13:
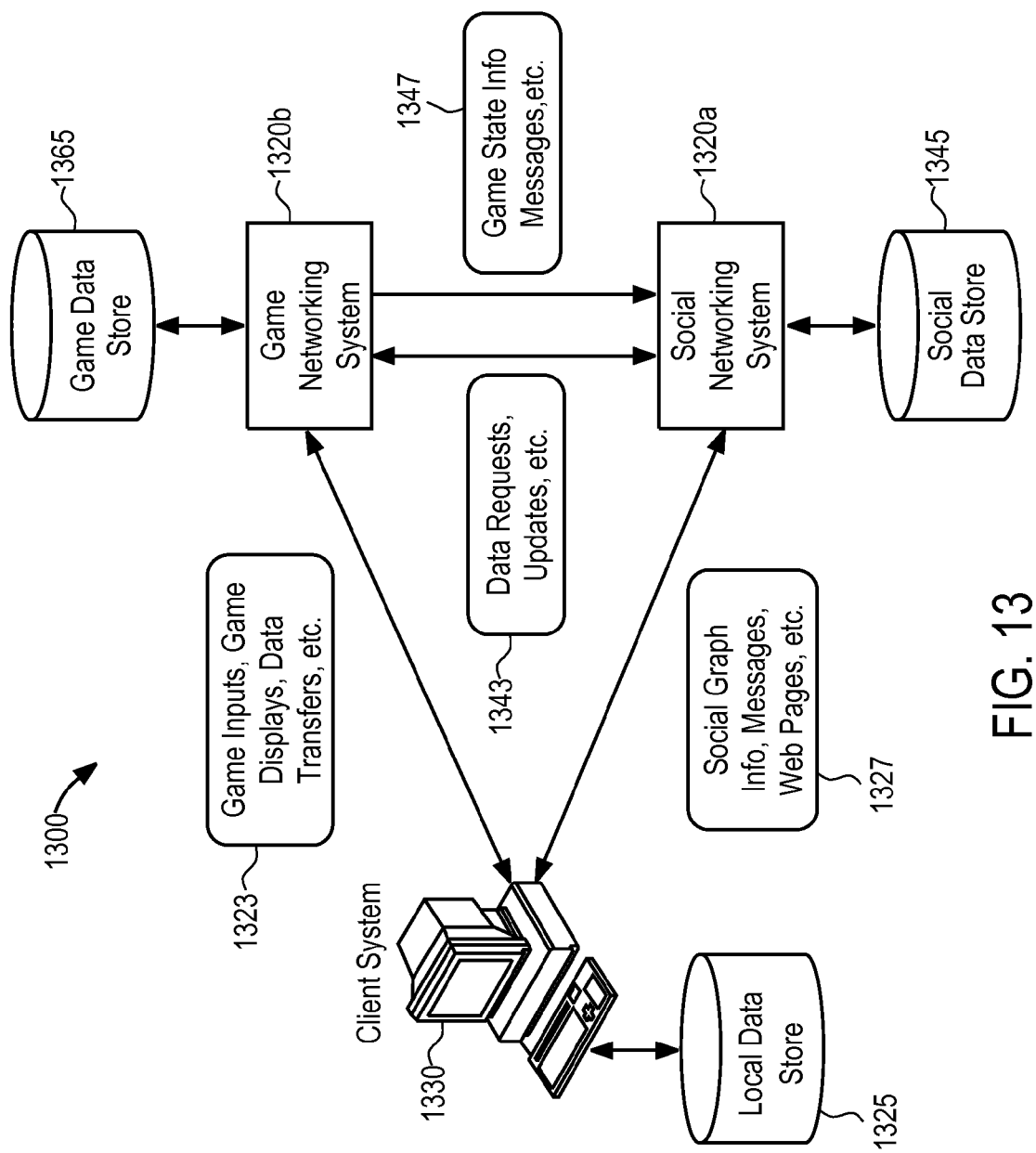
FIG. 13 illustrates an example data flow between example components of the example gaming platform of FIG. 1, according to some embodiments.

FIG. 13 illustrates an example data flow between example components of an example system 1300. One or more of the components of the example system 1300 may correspond to one or more of the components of the example gaming platform 100. In some embodiments, system 1300 includes a client system 1330, a social networking system 1320a, and a game networking system 1320b. The components of system 1300 can be connected to each other in any suitable configuration, using any suitable type of connection. The components may be connected directly or over any suitable network. The client system 1330, the social networking system 1320a, and the game networking system 1320b may have one or more corresponding data stores such as the local data store 1325, the social data store 1345, and the game data store 1365, respectively.

The client system 1330 may receive and transmit data 1323 to and from the game networking system 1320b. This data can include, for example, a web page, a message, a game input, a game display, a HTTP packet, a data request, transaction information, and other suitable data. At some other time, or at the same time, the game networking system 1320b may communicate data 1343, 1347 (e.g., game state information, game system account information, page info, messages, data requests, updates, etc.) with other networking systems, such as the social networking system 1320a (e.g., Facebook, Myspace, etc.). The client system 1330 can also receive and transmit data 1327 to and from the social networking system 1320a. This data can include, for example, web pages, messages, social graph information, social network displays, HTTP packets, data requests, transaction information, updates, and other suitable data.

Communication between the client system 1330, the social networking system 1320a, and the game networking system 1320b can occur over any appropriate electronic communication medium or network using any suitable communications protocols. For example, the client system 1330, as well as various servers of the systems described herein, may include Transport Control Protocol/Internet Protocol (TCP/IP) networking stacks to provide for datagram and transport functions. Of course, any other suitable network and transport layer protocols can be utilized.

In some embodiments, an instance of a virtual game is stored as a set of game state parameters that characterize the state of various in-game objects, such as, for example, player character state parameters, non-player character parameters, and virtual item parameters. In some embodiments, game state is maintained in a database as a serialized, unstructured string of text data as a so-called Binary Large Object (BLOB). When a user accesses a virtual game on the game networking system 1320b, the BLOB containing the game state for the instance corresponding to the user may be transmitted to the client system 1330 for use by a client-side executed object to process. In some embodiments, the client-side executable is a FLASH-based game, which can de-serialize the game state data in the BLOB. As a user plays the game, the game logic implemented at the client system 1330 maintains and modifies the various game state parameters locally. The client-side game logic may also batch game events, such as mouse clicks, and transmit these events to the game networking system 1320b. Game networking system 1320b may itself operate by retrieving a copy of the BLOB from a database or an intermediate memory cache (memcache) layer. The game networking system 1320b can also de-serialize the BLOB to resolve the game state parameters and execute its own game logic based on the events in the batch file of events transmitted by the client to synchronize the game state on the server side. The game networking system 1320b may then re-serialize the game state, now modified into a BLOB, and pass this to a memory cache layer for lazy updates to a persistent database.

In some embodiments, a computer-implemented game is a text-based or turn-based game implemented as a series of web pages that are generated after a user selects one or more actions to perform. The web pages may be displayed in a browser client executed on the client system 1330. For example, a client application downloaded to the client system 1330 may operate to serve a set of web pages to a user. As another example, a virtual game may be an animated or rendered game executable as a stand-alone application or within the context of a webpage or other structured document. In some embodiments, the virtual game is implemented using Adobe Flash-based technologies. As an example, a game may be fully or partially implemented as a SWF object that is embedded in a web page and executable by a Flash media user plug-in. In some embodiments, one or more described web pages is associated with or accessed by the social networking system 1320a. This disclosure contemplates using any suitable application for the retrieval and rendering of structured documents hosted by any suitable network-addressable resource or website.

Application event data of a game is any data relevant to the game (e.g., user inputs). In some embodiments, each application datum may have a name and a value, and the value of the application datum may change (e.g., be updated) at any time. When an update to an application datum occurs at the client system 1330, either caused by an action of a game user or by the game logic itself, the client system 1330 may need to inform the game networking system 1320b of the update. For example, if the game is a farming game with a harvest mechanic (such as Zynga FarmVille), an event can correspond to a user clicking on a parcel of land to harvest a crop. In such an instance, the application event data may identify an event or action (e.g., harvest) and an object in the game to which the event or action applies.

In some embodiments, one or more objects of a game is represented as an Adobe Flash object. Flash may manipulate vector and raster graphics, and supports bidirectional streaming of audio and video. "Flash" may mean the authoring environment, the user, or the application files. In some embodiments, the client system 1330 may include a Flash client. The Flash client may be configured to receive and run Flash application or game object code from any suitable networking system (such as, for example, the social networking system 1320a or the game networking system 1320b). In some embodiments, the Flash client is run in a browser client executed on the client system 1330. A user can interact with Flash objects using the client system 1330 and the Flash client. The Flash objects can represent a variety of in-game objects. Thus, the user may perform various in-game actions on various in-game objects by making various changes and updates to the associated Flash objects.

In some embodiments, in-game actions are initiated by clicking or similarly interacting with a Flash object that represents a particular in-game object. For example, a user can interact with a Flash object to use, move, rotate, delete, attack, shoot, or harvest an in-game object. This disclosure contemplates performing any suitable in-game action by interacting with any suitable Flash object. In some embodiments, when the user makes a change to a Flash object representing an in-game object, the client-executed game logic may update one or more game state parameters associated with the in-game object. To ensure synchronization between the Flash object shown to the user at the client system 1330, the Flash client may send the events that caused the game state changes to the in-game object to the game networking system 1320b. However, to expedite the processing and hence the speed of the overall gaming experience, the Flash client may collect a batch of some number of events or updates into a batch file. The number of events or updates may be determined by the Flash client dynamically or determined by the game networking system 1320b based on server loads or other factors. For example, client system 1330 may send a batch file to the game networking system 1320b whenever 50 updates have been collected or after a threshold period of time, such as every minute.

As used herein, the term "application event data" may refer to any data relevant to a computer-implemented virtual game application that may affect one or more game state parameters, including, for example and without limitation, changes to user data or metadata, changes to user social connections or contacts, user inputs to the game, and events generated by the game logic. In some embodiments, each application datum has a name and a value. The value of an application datum may change at any time in response to the game play of a user or in response to the game engine (e.g., based on the game logic). In some embodiments, an application data update occurs when the value of a specific application datum is changed.

In some embodiments, when a user plays a virtual game on the client system 1330, the game networking system 1320b serializes all the game-related data, including, for example and without limitation, game states, game events, user inputs, for this particular user and this particular game into a BLOB and may store the BLOB in a database. The BLOB may be associated with an identifier that indicates that the BLOB contains the serialized game-related data for a particular user and a particular virtual game. In some embodiments, while a user is not playing the virtual game, the corresponding BLOB may be stored in the database. This enables a user to stop playing the game at any time without losing the current state of the game the user is in. When a user resumes playing the game next time, game networking system 1320b may retrieve the corresponding BLOB from the database to determine the most-recent values of the game-related data. In some embodiments, while a user is playing the virtual game, the game networking system 1320b also loads the corresponding BLOB into a memory cache so that the game system may have faster access to the BLOB and the game-related data contained therein.

Figure 14:
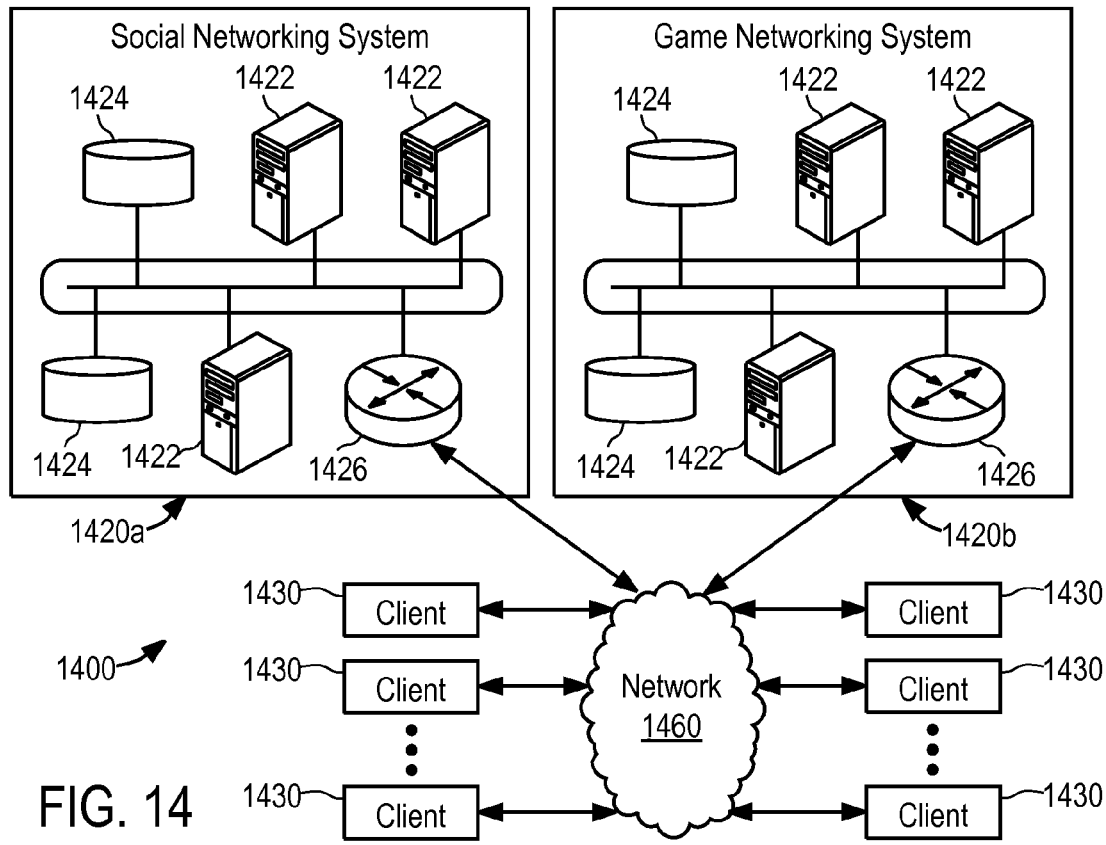
FIG. 14 illustrates an example network environment, in which various example embodiments may operate.

Various embodiments may operate in a wide area network environment, such as the Internet, including multiple network addressable systems. FIG. 14 illustrates an example network environment 1400, in which various example embodiments may operate. Network cloud 1460 generally represents one or more interconnected networks, over which the systems and hosts described herein can communicate. Network cloud 1460 may include packet-based wide area networks (such as the Internet), private networks, wireless networks, satellite networks, cellular networks, paging networks, and the like. As FIG. 14 illustrates, various embodiments may operate in a network environment 1400 comprising one or more networking systems, such as a social networking system 1420a, a game networking system 1420b, and one or more client systems 1430. The components of the social networking system 1420a and the game networking system 1420b operate analogously; as such, hereinafter they may be referred to simply as the networking system 1420. The client systems 1430 are operably connected to the network environment 1400 via a network service provider, a wireless carrier, or any other suitable means.

The networking system 1420 is a network addressable system that, in various example embodiments, comprises one or more physical servers 1422 and data stores 1424. The one or more physical servers 1422 are operably connected to computer network cloud 1460 via, by way of example, a set of routers and/or networking switches 1426. In an example embodiment, the functionality hosted by the one or more physical servers 1422 may include web or HTTP servers, FTP servers, as well as, without limitation, webpages and applications implemented using Common Gateway Interface (CGI) script, PHP Hyper-text Preprocessor (PHP), Active Server Pages (ASP), Hyper-Text Markup Language (HTML), Extensible Markup Language (XML), Java, JavaScript, Asynchronous JavaScript and XML (AJAX), Flash, ActionScript, and the like.

The physical servers 1422 may host functionality directed to the operations of the networking system 1420. Hereinafter servers 1422 may be referred to as server 1422, although the server 1422 may include numerous servers hosting, for example, the networking system 1420, as well as other content distribution servers, data stores, and databases. Data store 1424 may store content and data relating to, and enabling, operation of, the networking system 1420 as digital data objects. A data object, in some embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc.

Logically, data store 1424 corresponds to one or more of a variety of separate and integrated databases, such as relational databases and object-oriented databases, that maintain information as an integrated collection of logically related records or files stored on one or more physical systems. Structurally, data store 1424 may generally include one or more of a large class of data storage and management systems. In some embodiments, data store 1424 may be implemented by any suitable physical system(s) including components, such as one or more database servers, mass storage media, media library systems, storage area networks, data storage clouds, and the like. In one example embodiment, data store 1424 includes one or more servers, databases (e.g., MySQL), and/or data warehouses. Data store 1424 may include data associated with different networking system 1420 users and/or client systems 1430.

The client system 1430 is generally a computer or computing device including functionality for communicating (e.g., remotely) over a computer network. The client system 1430 may be a desktop computer, laptop computer, personal digital assistant (PDA), in- or out-of-car navigation system, smart phone or other cellular or mobile phone, or mobile gaming device, among other suitable computing devices. Client system 1430 may execute one or more client applications, such as a Web browser.

When a user at a client system 1430 desires to view a particular webpage (hereinafter also referred to as target structured document) hosted by the networking system 1420, the user's web browser, or other document rendering engine or suitable client application, formulates and transmits a request to the networking system 1420. The request generally includes a URL or other document identifier as well as metadata or other information. By way of example, the request may include information identifying the user, a timestamp identifying when the request was transmitted, and/or location information identifying a geographic location of the user's client system 1430 or a logical network location of the user's client system 1430.

Although the example network environment 1400 described above and illustrated in FIG. 14 is described with respect to the social networking system 1420a and the game networking system 1420b, this disclosure encompasses any suitable network environment using any suitable systems. For example, a network environment may include online media systems, online reviewing systems, online search engines, online advertising systems, or any combination of two or more such systems.

Figure 15:
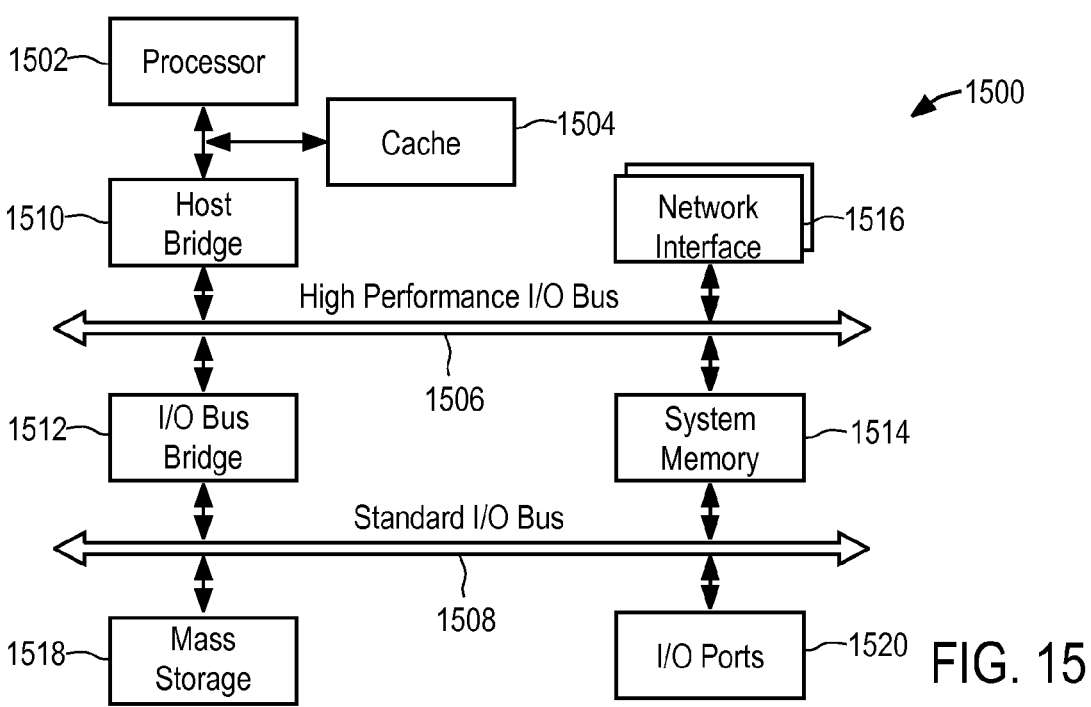
FIG. 15 illustrates an example computing system architecture, which may be used to implement one or more of the methodologies described herein, according to some embodiments

FIG. 15 illustrates an example computing system architecture, which may be used to implement a server 1422 or a client system 1430. In one embodiment, the hardware system 1500 comprises a processor 1502, a cache memory 1504, and one or more executable modules and drivers, stored on a tangible computer-readable storage medium, directed to the functions described herein. Additionally, the hardware system 1500 may include a high performance input/output (I/O) bus 1506 and a standard I/O bus 1508. A host bridge 1510 may couple the processor 1502 to the high performance I/O bus 1506, whereas the I/O bus bridge 1512 couples the two buses 1506 and 1508 to each other. A system memory 1514 and one or more network/communication interfaces 1516 may couple to the bus 1506. The hardware system 1500 may further include video memory (not shown) and a display device coupled to the video memory. Mass storage 1518 and I/O ports 1520 may couple to the bus 1508. The hardware system 1500 may optionally include a keyboard, a pointing device, and a display device (not shown) coupled to the bus 1508. Collectively, these elements are intended to represent a broad category of computer hardware systems.

The elements of the hardware system 1500 are described in greater detail below. In particular, the network interface 1516 provides communication between the hardware system 1500 and any of a wide range of networks, such as an Ethernet (e.g., IEEE 802.3) network, a backplane, etc. The mass storage 1518 provides permanent storage for the data and programming instructions to perform the above-described functions implemented in servers 922 of FIG. 15, whereas system memory 1514 (e.g., DRAM) provides temporary storage for the data and programming instructions when executed by the processor 1502. I/O ports 1520 are one or more serial and/or parallel communication ports that provide communication between additional peripheral devices, which may be coupled to the hardware system 1500.

The hardware system 1500 may include a variety of system architectures and various components of the hardware system 1500 may be rearranged. For example, cache memory 1504 may be on-chip with the processor 1502. Alternatively, the cache memory 1504 and the processor 1502 may be packed together as a "processor module," with processor 1502 being referred to as the "processor core." Furthermore, certain embodiments of the present disclosure may neither require nor include all of the above components. For example, the peripheral devices shown coupled to the standard I/O bus 1508 may couple to the high performance I/O bus 1506. In addition, in some embodiments, only a single bus may exist, with the components of the hardware system 1500 being coupled to the single bus. Furthermore, the hardware system 1500 may include additional components, such as additional processors, storage devices, or memories.

An operating system manages and controls the operation of the hardware system 1500, including the input and output of data to and from software applications (not shown). The operating system provides an interface between the software applications being executed on the system and the hardware components of the system. Any suitable operating system may be used.

Furthermore, the above-described elements and operations may comprise instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions may be executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the embodiments can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A computer-implemented method, comprising:
in an automated operation using one more processors,
receiving, by a server computing device, an indication of a placement event occurring at a client computing device, the placement event corresponding to a user selecting selection coordinates for a placement of a game object within a graphical user interface presenting an isometric projection of a virtual environment, the game object being modeled with a two-dimensional model;
determining, at the server computing device, based on the selection coordinates, a front-side surface area selected from an existing game object;
generating, at the server computing device, data representative of the placement of the game object within the virtual environment relative to the front-side surface area selected from the existing game object, wherein the data comprises a height of the game object based on a height of the existing game object increased by a determinable amount;
generating, at the server computing device, game state data representative of the game object placed within the virtual environment relative to the front-side surface area, wherein the server computing device and the client computing device are independent of each other.

2. The computer-implemented method of claim 1, wherein the game object includes a pre-rendered two-dimensional image.

3. The computer-implemented method of claim 1, wherein a first game object position data structure specifies a location of the existing game object within the isometric projection of the virtual environment.

4. The computer-implemented method of claim 3, further comprises:
generating a second game object position data structure specifying a location of the game object within the isometric projection of the virtual environment, the second game object position data structure including coordinates that are based on the first game object position data structure and the front-side surface area, wherein the front-side area comprises a front-right surface.

5. The computer-implemented method of claim 4, wherein each of the first and second game object position data structures include a first index specifying a first isometric axis, and second index specifying a second isometric axis, and a third index specifying a respective height.

6. The computer-implemented method of claim 1, wherein the existing game object comprises:
a first line segment along a vertical axis of a two-dimensional Cartesian coordinate system;
a second line segment joined to an endpoint of the first line; and
a third line segment joined at the endpoint of the first line segment, wherein the second and third line segment form an angle consistent with the isometric projection of the virtual environment, wherein the front-side area comprises a front-right surface.

7. The computer-implemented method of claim 6, wherein determining, based on the selection coordinates, a front-side surface area selected from an existing game object comprises:
determining a horizontal coordinate of the selection coordinates is one of more than or equal to a horizontal coordinate of the first line segment; and
determining the selection coordinates are below the second line segment.

8. The computer-implemented method of claim 6, wherein determining the front-side surface area selected from the existing game object comprises:
determining the selection coordinates are below the second line segment.

9. A server computer system, comprising:
a processor;
a memory device holding an instruction set executable on the processor to cause the computer system to perform operations comprising:
receiving, from a client computing device, an indication of a placement event corresponding to a user selecting selection coordinates for a placement of a game object within a graphical user interface presenting an isometric projection of a virtual environment, the game object being modeled with a two-dimensional model;
determining, based on the selection coordinates, a front-side surface area selected from an existing game object;
receiving generating data representative of the placement of the game object within the virtual environment relative to the front-side surface area selected from the existing game object, wherein the data comprises a height of the game object based on a height of the existing game object increased by a determinable amount; and
generating game state data representative of the game object placed within the virtual environment relative to the front-side surface area, wherein the server computer system and the client computing device are independent of each other.

10. The server computer system of claim 9, wherein the game object includes a pre-rendered two-dimensional image, wherein the front-side area comprises a front-right surface.

11. The server computer system of claim 9, wherein a first game object position data structure specifies a location of the existing game object within the isometric projection of the virtual environment.

12. The server computer system of claim 11, further comprises:
generating a second game object position data structure specifying a location of the game object within the isometric projection of the virtual environment, the second game object position data structure including coordinates that are based on the first game object position data structure and the front-side surface area.

13. The server computer system of claim 11, wherein each of the first and second game object position data structures include a first index specifying a first isometric axis, and second index specifying a second isometric axis, and a third index specifying a respective height.

14. The server computer system of claim 9, wherein the existing game object comprises:
a first line segment along a vertical axis of a two-dimensional Cartesian coordinate system;
a second line segment joined to an endpoint of the first line; and
a third line segment joined at the endpoint of the first line segment, wherein the second and third line segment form an angle consistent with the isometric projection of the virtual environment, wherein the front-side area comprises a front-right surface.

15. The server computer system of claim 14, wherein determining, based on the selection coordinates, a front-side surface area selected from an existing game object comprises:
   determining a horizontal coordinate of the selection coordinates is one of more than or equal to a horizontal coordinate of the first line segment; and
   determining the selection coordinates are below the second line segment.

16. The server computer system of claim 14, wherein determining the front-side surface area selected from the existing game object comprises:
   determining the selection coordinates are below the second line segment.

17. A non-transitory computer-readable medium storing executable instructions thereon, which, when executed by a processor, cause the processor to perform operations comprising:
   receiving, by a server computer device, an indication of a placement event occurring at a client computing device, the placement event corresponding to a user selecting selection coordinates for a placement of a game object within a graphical user interface presenting an isometric projection of a virtual environment, the game object being modeled with a two-dimensional model;
   determining, by the server computing device, based on the selection coordinates, a front-side surface area selected from an existing game object;
   generating, by the server computing device, data representative of placement of the game object within the virtual environment relative to the front-side surface area selected from the existing game object, wherein the data comprises a height of the game object based on a height of the existing game object increased by a determinable amount; and
   generating, by the server computing device, game state data representative of the game object placed within the virtual environment relative to the front-side surface area, wherein the server computing device and the client computing device are independent of each other.

* * * * *